J. P. Crawford.
Composition Pavement.
N? 88,139.   Patented Mar. 23, 1869.
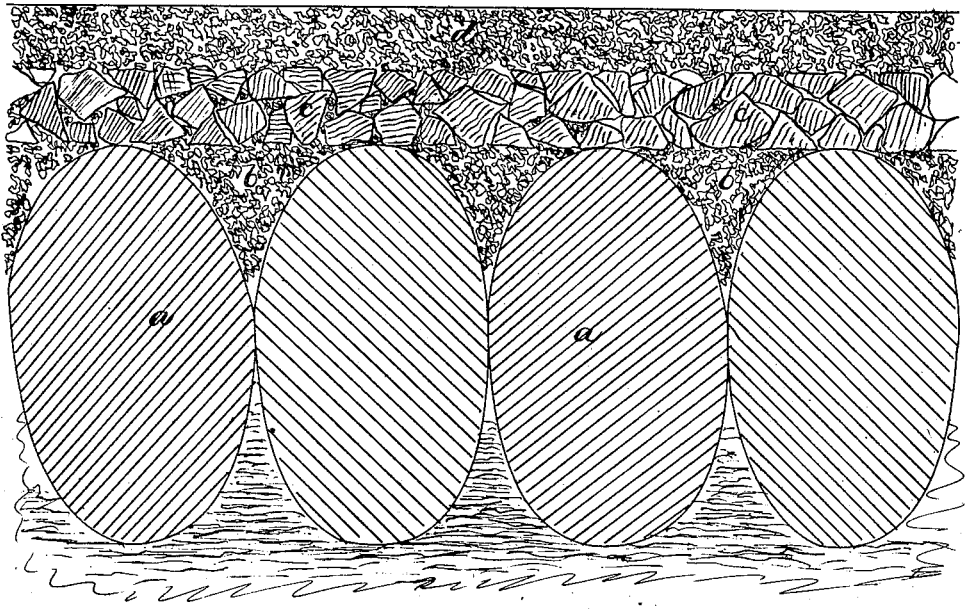
Witnesses;
Chas. H. Smith
Geo. D. Walker
Inventor;
John P. Crawford

JOHN P. CRANFORD, OF BROOKLYN, NEW YORK.

Letters Patent No. 88,139, dated March 23, 1869.

IMPROVED COMPOSITION-PAVEMENT.

The Schedule referred to in these Letters Patent and making part of the same.

*To all whom it may concern:*

Be it known that I, JOHN P. CRANFORD, of Brooklyn, in the county of Kings, and State of New York, have invented and made a new and useful Improvement in Composition-Pavements; and I do hereby declare the following to be a full, clear, and exact description of the said invention, and of the features distinguishing the same from other composition-pavements.

In forming pavements of sand, gravel, broken stone, tar, and similar material, it is usual to remove the old round, or cobble-stone pavement, and excavate to the desired depth, and then form the roadway with layers of such materials, and roll them, for causing the mass to consolidate properly. In doing this, considerable expense is involved in removing the stones of the pavement, and in supplying sufficient thickness of composition-pavement for the required strength.

The nature of my said invention consists in a method of preparing the foundation and laying the composition-pavement, so as to avail of the stones already laid in the street, and put upon them a surface that makes a smooth roadway, and one that is water-proof, so that the frost will not injure the same.

I first prepare the cobble or other stones that may be laid in the streets, by driving them down moderately even by a heavy roller, or by rammers, and, if necessary, reset any loose or misplaced stones. I then remove the earth, or dirt from between the stones, and clean the upper surface of the stones by brushing or scraping, and when the exposed surfaces of the stones are dry, I apply tar, or similar bituminous material, in a melted, or liquid state, by pouring the same upon the stones.

In the drawing annexed, the improvement is illustrated by a vertical section, *a a*, representing the cobble-stones as prepared in the aforesaid manner.

I next apply a composition, formed of sand, ashes, gravel, or similar material, rendered plastic by the admixture of sufficient tar, or other bituminous material. This is rammed, or otherwise forced into the interstices of the stones, so as to adhere to them. This layer is shown at *b*.

A second layer is applied to form a body for the composition-pavement. This is composed of gravel or broken stone, mixed with sand, or gravel and ashes, or similar materials, rendered sufficiently plastic or adhesive, by tar, or bituminous material, to cause the mass to consolidate firmly when exposed to a heavy pressure, by rolling, or otherwise. This also more fully consolidates the first layer, *b*, and causes its adhesion to the stones. This layer is represented at *c*.

A top layer, *d*, is applied for making a smooth and somewhat elastic surface. It is composed of finer materials than the layer *c*, such as gravel, sand, ashes, and tar, or bituminous material, and it is to be rolled even and solid.

A pavement formed in the manner specified, is very durable, and can be laid at much less cost than those before constructed of stone, gravel, &c., and bituminous material, because it does not require to be so thick. Water being excluded from the foundation, there can be no injury from frost.

What I claim, and desire to secure by Letters Patent, is—

The composition-pavement, formed of layers, applied to and combined with a stone pavement, in substantially the manner specified.

In witness whereof, I have hereunto set my signature, this 18th day of February, 1869.

JOHN P. CRANFORD.

Witnesses:
CHAS. H. SMITH,
GEO. T. PINCKNEY.